(12) United States Patent
Futamura

(10) Patent No.: US 11,373,762 B2
(45) Date of Patent: Jun. 28, 2022

(54) INFORMATION COMMUNICATION DEVICE, AUTHENTICATION PROGRAM FOR INFORMATION COMMUNICATION DEVICE, AND AUTHENTICATION METHOD

(71) Applicant: Norihito Futamura, Aichi (JP)

(72) Inventor: Norihito Futamura, Aichi (JP)

( * ) Notice: Subject to any disclaimer, the term of this patent is extended or adjusted under 35 U.S.C. 154(b) by 0 days.

(21) Appl. No.: 17/252,083

(22) PCT Filed: Sep. 21, 2019

(86) PCT No.: PCT/JP2019/037147
§ 371 (c)(1),
(2) Date: Dec. 14, 2020

(87) PCT Pub. No.: WO2020/071164
PCT Pub. Date: Apr. 9, 2020

(65) Prior Publication Data
US 2021/0249145 A1 Aug. 12, 2021

(30) Foreign Application Priority Data
Oct. 1, 2018 (JP) .............................. JP2018-186920

(51) Int. Cl.
*H04L 29/06* (2006.01)
*G16Y 30/10* (2020.01)
(Continued)

(52) U.S. Cl.
CPC ............. *G16Y 30/10* (2020.01); *G06F 21/44* (2013.01); *G16Y 40/50* (2020.01);
(Continued)

(58) Field of Classification Search
CPC ......... G16Y 30/10; G06F 21/44; G06F 21/45; H04L 63/06; H04L 63/061; H04L 63/062;
(Continued)

(56) References Cited

U.S. PATENT DOCUMENTS

| 7,482,526 B2 | 1/2009 | Tanase et al. |
| 2005/0154777 A1 | 7/2005 | Tanase et al. |
| 2007/0083750 A1 | 4/2007 | Miura et al. |

(Continued)

FOREIGN PATENT DOCUMENTS

| JP | 2002-288134 A | 10/2002 |
| JP | 2005-102163 A | 4/2005 |

(Continued)

OTHER PUBLICATIONS

International Search Report dated Nov. 19, 2019 issued in corresponding PCT/JP2019/037147 application (2 pages).

(Continued)

*Primary Examiner* — Tri M Tran
(74) *Attorney, Agent, or Firm* — Millen, White, Zelano & Branigan, P.C.; Allison Gaul; William Nixon

(57) ABSTRACT

To provide an authentication technique having higher security between IoT devices and server devices or between IoT devices.

The server device provides, to the terminal device, a parameter file including a predetermined identifier for uniquely identifying a relationship between the terminal device and the server device, and connection destination information regarding a connection destination of the server device, the terminal device accesses the server device specified by the connection destination information in the parameter file, requests issuance of a timed identification number, and transmits the identifier and the timed identification number to the server device when connecting to the server device specified by the connection destination information in the parameter file, and the server device authenticates the ter- (Continued)

minal device using the identifier, and confirms an authenticity of the terminal device using the timed identification number.

6 Claims, 7 Drawing Sheets

(51) Int. Cl.
    *G16Y 40/50*       (2020.01)
    *G06F 21/44*       (2013.01)
    *H04L 9/40*        (2022.01)
    *H04L 9/32*        (2006.01)

(52) U.S. Cl.
    CPC ...... *H04L 63/0869* (2013.01); *H04L 63/0876* (2013.01); *H04L 9/32* (2013.01)

(58) Field of Classification Search
    CPC ..... H04L 63/065; H04L 63/067; H04L 63/08; H04L 63/0869; H04L 63/0876; H04L 9/08; H04L 9/0816; H04L 9/0819; H04L 9/083; H04L 9/0838; H04L 9/0847; H04L 9/32; H04L 9/321; H04L 9/3247; H04L 9/3263; H04L 9/3268
    See application file for complete search history.

(56) References Cited

U.S. PATENT DOCUMENTS

| | | | |
|---|---|---|---|
| 2007/0256118 | A1 | 11/2007 | Nomura et al. |
| 2016/0248746 | A1* | 8/2016 | James ................ H04L 9/3268 |
| 2016/0366124 | A1* | 12/2016 | Benoit ................ H04L 63/061 |
| 2017/0048700 | A1* | 2/2017 | Huang ................ H04L 63/062 |
| 2018/0109395 | A1* | 4/2018 | Berdy ................ H04L 63/0823 |
| 2018/0159834 | A1* | 6/2018 | Hughes ................ H04L 63/062 |

FOREIGN PATENT DOCUMENTS

| | | |
|---|---|---|
| JP | 2005-215671 A | 8/2005 |
| JP | 2005-303530 A | 10/2005 |
| JP | 2007-316678 A | 12/2007 |
| JP | 2015-219670 A | 12/2015 |

OTHER PUBLICATIONS

English Abstract of JP 2002-288134 A published Oct. 4, 2002.
English Abstract of JP 2015-219670 A published Dec. 7, 2015.
English Abstract of JP 2005-303530 A published Oct. 27, 2005.

* cited by examiner

INFORMATION COMMUNICATION DEVICE, AUTHENTICATION PROGRAM FOR INFORMATION COMMUNICATION DEVICE, AND AUTHENTICATION METHOD

TECHNICAL FIELD

The present invention relates to an information communication device, an authentication program for the information communication device, and an authentication method.

BACKGROUND ART

In recent years, a mechanism (Internet of Things (IoT)) for connecting various devices to the Internet and using information thereof has become widespread. In a cloud service, for example, various devices transmit data to a cloud server or use a function provided by the service. In order to securely connect the device to the cloud server and establish communication with the cloud service, it is necessary to correctly authenticate the certainty of the device and allow the connection. Patent Literature 1 discloses an authority delegation system that enables settings for delegating authority to a large number of devices.

Using the above-mentioned IoT mechanism, the general term for the devices that connect to the Internet may be called IoT devices. More specifically, the IoT device is a device that connects to a wired or wireless network.

These devices connect to devices called edge servers and devices called gateways, and after connecting to the Internet via them, these devices connect to the cloud or on-premises servers or connect to other IoT devices.

CITATIONS LIST

Patent Literature

Patent Literature 1: Japanese Unexamined Patent Publication No. 2017-126191

SUMMARY OF INVENTION

Technical Problems

In a case where a server that provides cloud services to a pre-registered IoT device receives, from the IoT device, a connection request with respect to the server on the cloud, the server performs authentication processing of determining whether the IoT device is a pre-registered legitimate IoT device by using the identification information and password transmitted from the IoT device, in some cases.

However, it is also a problem that the password is reused without being changed, the authentication method for the identification information and password in the related art is vulnerable in terms of security, and it becomes difficult to sufficiently prevent unauthorized access by spoofing.

The present invention has been made in view of such a situation, and provides an authentication technique having higher security between IoT devices and server devices or between IoT devices.

Solutions to Problems

In order to achieve the object, an information processing system according to an aspect of the present invention is an information processing system including a server device and a terminal device of the same type or a different type capable of performing communication via a communication network, the server device includes a provision unit that provides, to the terminal device, a parameter file including a predetermined identifier for uniquely identifying a relationship between the terminal device and the server device, and connection destination information regarding a connection destination of the server device, the terminal device includes a request unit that accesses the server device specified by the connection destination information in the parameter file, and requests issuance of a timed identification number, and a transmission unit that transmits the identifier and the timed identification number to the server device when connecting to the server device specified by the connection destination information in the parameter file, and the server device includes an authentication unit that authenticates the terminal device using the identifier, and confirms an authenticity of the terminal device using the timed identification number.

Advantageous Effects of Invention

According to the present invention, it is possible to provide an authentication technique having higher security between IoT devices and server devices or between IoT devices.

DESCRIPTION OF EMBODIMENTS

Figure 1:
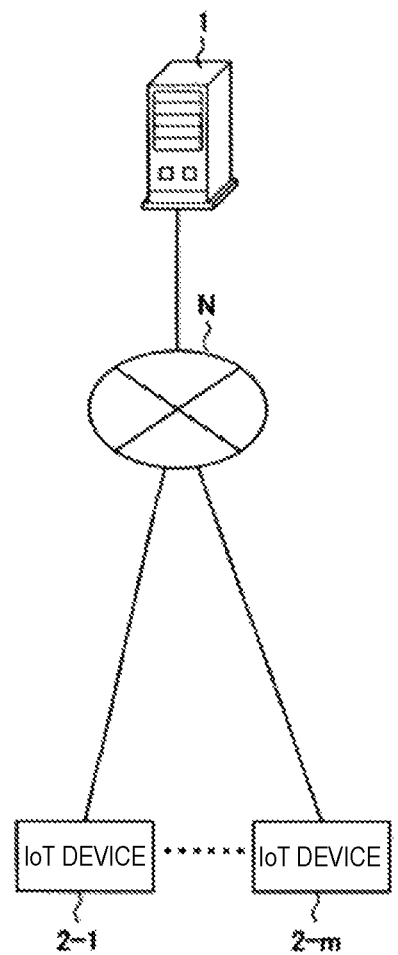
FIG. 1 is a diagram illustrating a configuration of an information processing system according to an embodiment of the present invention.

In a case where device connection by IoT is not assumed, for example, for an electricity meter deployed in a home (contractor X), a power company that is a contractor thereof recognizes and identifies that the electricity meter of that home (contractor X) is an electricity meter X1.

In addition, the home (contractor X) recognizes and identifies that the power contractor is a power company A. Both the contractor X and the power company A trust that the power company A correctly detects the value of the electricity meter X1.

On the other hand, in a case where an IoT device X2 connects to a device or data destination server (center device Y) connected via a network for a certain purpose, or an IoT device X3 different from the IoT device X2, the terminal device X2 and the center device Y recognize and identify each other. In addition, the terminal device X2 and the terminal device X3 also recognize and identify each other.

According to the above example, in a case where the electricity meter X1 deployed in the above home (contractor X) and the power company A that manages the electricity meter X1 connect to each other via the network, the authenticity of the electricity meter X1 and the device (center device Y) of the power company A is not guaranteed unless the authenticity is guaranteed by some means. This is because "spoofing" is possible due to the characteristics of the network connection.

As for the devices connecting to each other via the network, the device at the connection destination as seen from the own device may be "spoofing". If the authenticity of the connection destination is required, it is conceivable to use third-party authentication such as a digital signature.

Since a device connecting to the network in this way can be spoofed, the authenticity of the device is ensured by the third-party authentication using a digital certificate. Therefore, in addition to the cost of the third-party authentication, a setting operation for the certificate or replacement of the device is required according to the validity period of the digital certificate.

For example, the number of households in Japan in 2015 was about 53.3 million, but in a case where the lifeline devices of electricity meters, water meters, and gas meters are not authenticated in an integrated manner, the third-party authentication for about 160 million which is three times the number of households will be used. Assuming that the cost of the third-party authentication is 500 yen per year, 800 trillion yen will be required for one year.

Therefore, in the IoT society full of IoT devices, it is not realistic in terms of cost to require only third-party authentication for the authenticity of connecting devices.

Therefore, in the embodiment of the present invention, a method of guaranteeing the mutual authenticity of two devices connecting to each other via the Internet (connection between the IoT device and the center device, or the like) without using the third-party authentication is proposed. By using this method in combination with the third-party authentication, it is possible to realize stronger proof of authenticity.

In addition, in two devices connecting to each other via the Internet (connection between the IoT device and the center device, or the like), a method of securely installing an application program (hereinafter, referred to as an "application") for guaranteeing mutual authenticity between the two devices, and a method of securely performing the update, or a method of performing transmission and reception of data such as parameters are proposed.

Hereinafter, embodiments of the present invention will be described with reference to the drawings.

FIG. 1 is a diagram illustrating a configuration of an information processing system according to an embodiment of the present invention. The information processing system illustrated in FIG. 1 is a system which adopts a more secure authentication method for the communication connection between an IoT device and a server device (hereinafter, referred to as a "server") that provides cloud services using the IoT device.

As illustrated in FIG. 1, the information processing system is configured to include a connection destination server 1 and IoT devices 2-1 to 2-m (m is an arbitrary integer). The connection destination server 1 and each of the IoT devices 2-1 to 2-m connect to each other via a predetermined network N such as the Internet.

The connection destination server 1 is a server to which the IoT devices 2-1 to 2-m connect in order to receive cloud services via the network N. The connection destination server 1 may not be a server that provides specific services to the IoT devices 2-1 to 2-m, but may be an authentication server that performs authentication of the IoT devices 2-1 to 2-m.

The IoT devices 2-1 to 2-m are all devices that connect to the Internet, and may be devices in which communication functions are added to the home appliances such as TVs, digital cameras, and lighting devices, or may be smart meters in which communication functions are added to electricity meters, water meters, gas meters, and the like, but the present invention is not limited thereto. Further, the IoT devices 2-1 to 2-m may be the same type of devices or may be different devices.

Hereinafter, in a case where it is not necessary to individually distinguish each of the IoT devices 2-1 to 2-m, the IoT devices 2-1 to 2-m are collectively referred to as the "IoT device 2".

Figure 2:
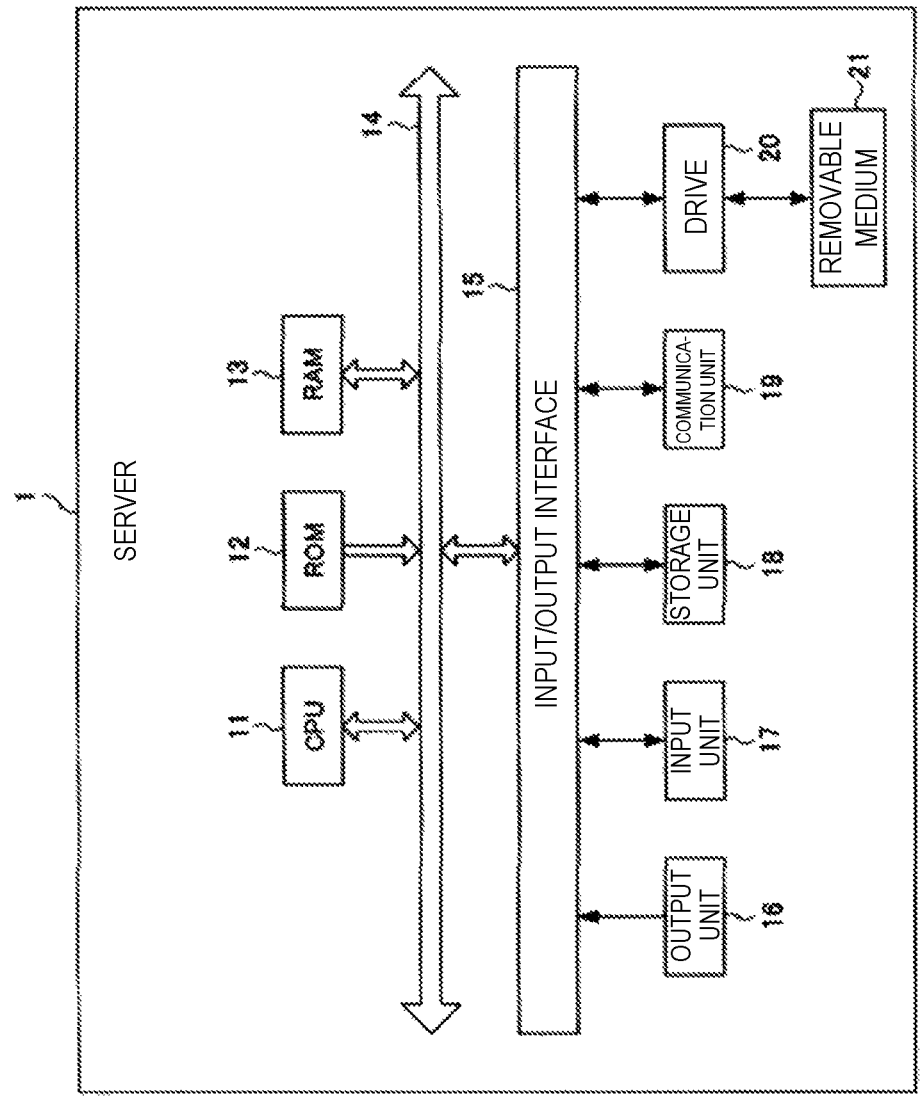
FIG. 2 is a block diagram illustrating a hardware configuration of a connection destination server 1 of the information processing system of FIG. 1.

FIG. 2 is a block diagram illustrating a hardware configuration of the connection destination server 1 of the information processing system of FIG. 1.

The connection destination server 1 includes a central processing unit (CPU) 11, a read only memory (ROM) 12, a random access memory (RAM) 13, a bus 14, an input/output interface 15, an output unit 16, an input unit 17, a storage unit 18, a communication unit 19, and a drive 20.

The CPU 11 executes various kinds of processing according to a program stored in the ROM 12 or a program loaded from the storage unit 18 into the RAM 13.

The RAM 13 also appropriately stores data and the like necessary for the CPU 11 to execute various kinds of processing.

The CPU 11, the ROM 12, and the RAM 13 are connected to each other via the bus 14. The input/output interface 15 is also connected to the bus 14. The output unit 16, the input unit 17, the storage unit 18, the communication unit 19, and the drive 20 are connected to the input/output interface 15.

The output unit 16 is composed of various liquid crystal displays and the like, and outputs various kinds of information.

The input unit 17 is composed of various hardware buttons and the like, and receives an input of various kinds of information.

The storage unit 18 is composed of a hard disk, a dynamic random access memory (DRAM), or the like, and stores various kinds of data.

The communication unit 19 controls communication with another device (the IoT device 2 in the example of FIG. 1) via the network N including the Internet.

The drive 20 is provided as needed. A removable medium 21 composed of a magnetic disk, an optical disk, a magneto-optical disk, a semiconductor memory, or the like is appropriately mounted on the drive 20. The program read from the removable medium 21 by the drive 20 is installed in the storage unit 18 as needed. Further, the removable medium 21 can also store various kinds of data stored in the storage unit 18, in the same manner as the storage unit 18.

Figure 3:
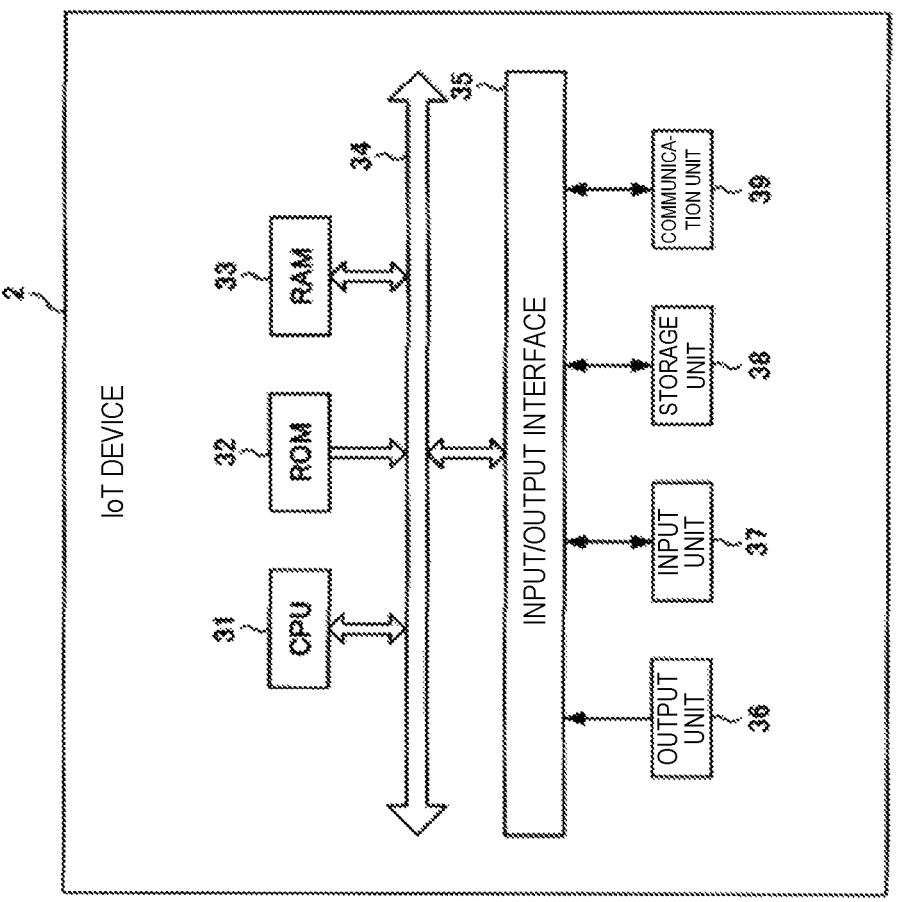
FIG. 3 is a block diagram illustrating a hardware configuration of an IoT device 2 of the information processing system of FIG. 1.

FIG. 3 is a block diagram illustrating a hardware configuration of the IoT device 2 of the information processing system of FIG. 1.

The IoT device 2 includes a CPU 31, a ROM 32, a RAM 33, a bus 34, an input/output interface 35, an output unit 36, an input unit 37, a storage unit 38, and a communication unit 39.

The CPU 31 executes various kinds of processing according to a program stored in the ROM 32 or a program loaded from the storage unit 38 into the RAM 33.

The RAM 33 also appropriately stores data and the like necessary for the CPU 31 to execute various kinds of processing.

The CPU 31, the ROM 32, and the RAM 33 are connected to each other via the bus 34. The input/output interface 35 is also connected to the bus 34. The output unit 36, the input unit 37, the storage unit 38, and the communication unit 39 are connected to the input/output interface 35.

The output unit 36 is, for example, a display unit, an actuator unit, or the like that exhibits the original function of the IoT device 2.

The input unit 37 is composed of various hardware buttons, a touch panel, various sensors, and the like, and receives an input of various kinds of information.

The storage unit 38 is composed of a flash memory or the like, and stores various kinds of data.

The communication unit 39 controls communication with another device (the connection destination server 1 in the example of FIG. 1) via the network N including the Internet.

By the cooperation among the connection destination server 1, the IoT device 2 (including the IoT devices 2), and various kinds of software, a series of authentication processing described below can be executed.

In the authentication processing in the present embodiment, the authenticity of two devices which connect to each other via the Internet is ensured as follows.

First, the authenticity of the IoT device 2 will be described. Focusing on the relationship that the IoT device 2 and the connection destination server 1 recognize and identify each other, an operator sets any identification information (IoT device identification information) that identifies the IoT device and a timed identification number (so called one-time password) which are issued by the connection destination server 1, to the IoT device 2.

In a case where the IoT device 2 connects to the connection destination server 1 and the connection destination server 1 authenticates the IoT device 2, the authenticity of the IoT device 2 from the viewpoint of the connection destination server 1 can be guaranteed by the IoT device 2 presenting the timed identification number to the connection destination server 1. However, in addition to this, the authenticity of the IoT device 2 can be doubly guaranteed by using a digital certificate issued by a third-party authentication body or the like.

Automatic authentication in the connection between the IoT device 2 and the connection destination server 1 is performed by a predetermined program installed in advance in the IoT device 2 and the connection destination server 1. In response to the request from the program, a person or a program performing the setting for the connection between the IoT device 2 and the connection destination server 1 enters an identification number, which will be described later, in some cases.

Next, the authenticity guarantee of the connection destination server 1 from the viewpoint of the IoT device 2 will be described. In the present embodiment, for example, it is assumed that the IoT device 2 connects to the network N with the setting in which the IoT device 2 cannot be detected from devices such as other computers (hereinafter, referred to as "PCs"), in order to make it difficult for the IoT device 2 to be attacked by a malicious attacker connecting to the network N.

Therefore, in a case where the IoT device 2 and the connection destination server 1 communicate with each other, the IoT device 2 always issues a connection request to the connection destination server 1.

Therefore, the authenticity of the connection destination server 1 is based on the correctness of the connection destination Uniform Resource Identifier (URI: name or writing rule that identifies the location) that is the destination of the connection request, or the correctness of the network address such as IPv6 that can be identified as the URI.

In addition, when the IoT device 2 connects to the connection destination server 1, the authenticity of the connection destination server 1 can be doubly checked by using a digital certificate issued by a third-party authentication body or the like of the connection destination server 1.

The method of delivering the URI or the like of the connection destination server 1 to the IoT device 2 will be described later.

Figure 4:
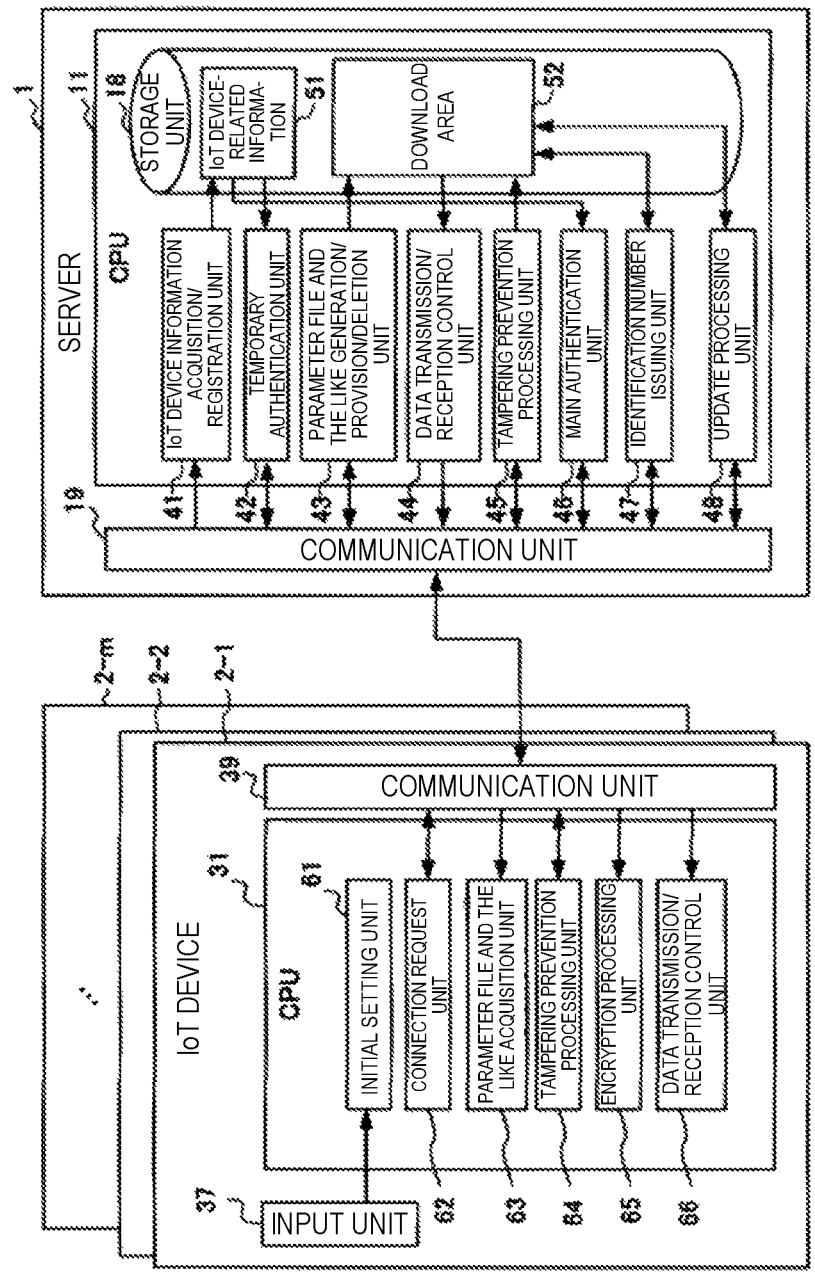
FIG. 4 is a functional block diagram illustrating a functional configuration example of the connection destination server 1 and the IoT device 2 of FIG. 1.

In order to realize the authentication processing according to the present embodiment, the connection destination server 1 and the IoT device 2 have a functional configuration as illustrated in FIG. 4.

FIG. 4 is a functional block diagram illustrating the functional configuration example of the connection destination server 1 and the IoT device 2 of FIG. 1.

It is assumed that the IoT device 2 and the connection destination server 1 mutually hold an encryption key of the common key method in advance when performing authentication. It is assumed that this encryption key is issued as a key unique to each IoT device 2, for example, by the connection destination server 1.

The CPU 31 of the IoT device 2 reads and executes the application program according to the present embodiment stored in the storage unit (not illustrated) to function as an initial setting unit 61, a connection request unit 62, a parameter file and the like acquisition unit 63, a tampering prevention processing unit 64, an encryption processing unit 65, and a data transmission/reception control unit 66

The application program may be installed on the IoT device 2 from the sales site or download site of the application, or may be installed in advance at the time of shipment from the factory.

The initial setting unit 61 acquires initial setting information (identification information for identifying the IoT device 2 (IoT device identification information), the URI of the connection destination server 1 (connection destination URI), and the identification number generated in advance in the connection destination server 1) input from the operator via the input unit 37, and sets the initial setting information in the IoT device 2.

When communication is performed with the connection destination server 1 based on instruction information or a program input from the input unit 37, the connection request unit 62 transmits connection request information (hereinafter, referred to as a "connection request") to the connection destination server 1 via the communication unit 39. The connection request is made in order to receive authentication (temporary authentication and main authentication) by the connection destination server 1. The connection request also includes an identification number issuance request that requests the connection destination server 1 to issue an identification number.

The parameter file and the like acquisition unit 63 acquires a parameter file transmitted from the connection destination server 1 via the communication unit 39.

The tampering prevention processing unit 64 performs processing of preventing data tampering by using a hash value in data transmission/reception between the IoT device 2 and the connection destination server 1 and processing of checking whether or not tampering has been performed using the hash value.

In a case where the temporary authentication by the connection destination server 1 is successful, the encryption processing unit 65 acquires the identification number issued from the connection destination server 1 via the communication unit 39, and encrypts the acquired identification number using the common key held in advance.

The data transmission/reception control unit 66 transmits data to the connection destination server 1 after the main authentication of the connection destination server 1 is completed, or receives data transmitted from the connection destination server 1 and stores the data in the storage unit (not illustrated).

The CPU 11 of the connection destination server 1 reads and executes the program stored in the storage unit 18 to function as an IoT device information acquisition/registration unit 41, a temporary authentication unit 42, a parameter file and the like generation/provision/deletion unit 43, a data transmission/reception control unit 44, a tampering prevention processing unit 45, a main authentication unit 46, an identification number issuing unit 47, and an update processing unit 48.

The IoT device information acquisition/registration unit 41 acquires information regarding the IoT device 2 that can connect to the connection destination server 1, which is input via the input unit 17 or the communication unit 19, and registers the information as IoT device-related information 51.

Further, the IoT device-related information 51 includes the IoT device identification information for identifying the IoT device 2, the URI (connection destination URI) for the IoT device 2 to connect to the connection destination server 1, the identification information (notification destination) for identifying the connection destination server 1, a unique identifier (connection identification information) for specifying the connection relationship between the IoT device 2 and the connection destination server 1, the second identification number, the common key and its expiration date, parameter expiration date, and the like.

The temporary authentication unit 42 performs processing of identifying the IoT device 2 that made the connection request and confirming the authenticity of the IoT device, which is first-stage authentication processing for the first connection request.

The parameter file and the like generation/provision/deletion unit 43 generates a parameter file including parameters to be provided to the IoT device 2 based on the IoT device-related information 51 after the authentication by the authentication processing by the temporary authentication unit 42 or the main authentication unit 46. The parameter file and the like generation/provision/deletion unit 43 arranges the generated parameter file in a download area 52 corresponding to each IoT device 2, which is secured in the storage unit 18.

The parameter file and the like generation/provision/deletion unit 43 transmits the parameter file, data, and the like arranged in the download area 52 to the IoT device 2 via the communication unit 19. The parameter file and the like generation/provision/deletion unit 43 deletes the parameter file, data, and the like arranged in the download area 52 based on a deletion request.

The data transmission/reception control unit 44 transmits data to the IoT device 2 after the main authentication of the connection destination server 1 is completed.

The tampering prevention processing unit 45 performs processing of preventing data tampering by using a hash value in data transmission/reception between the IoT device 2 and the connection destination server 1 and processing of checking whether or not tampering has been performed using the hash value.

The main authentication unit 46 performs authentication processing (main authentication processing) performed after the temporary authentication.

The identification number issuing unit 47 issues an identification number based on the identification number issuance request from the IoT device 2, and transmits the identification number to the IoT device 2 via the communication unit 19.

Here, parameters used in the authentication processing of the present embodiment will be described.

The "IoT device identification information" is an identifier unique to a device, which is issued in accordance with a predetermined rule in order to identify the IoT device 2. The IoT device identification information may be formed by, for example, a product model number of the IoT device 2+a serial number+a contractor number of the installation destination.

The "connection identification information" is a unique identifier for specifying the connection relationship between the IoT device 2 and the connection destination server 1. The connection identification information is generated in the program of the connection destination server 1 and is distributed to the IoT device 2 by the method described later.

It is assumed that the connection identification information will be a unique identifier in which two or more items in the world do not have the same value, similar to the identifier called universally unique identifier (UUID) and globally unique identifier (QUID).

The connection identification information is distributed from the connection destination server 1 to the IoT device 2 when the first connection is made between the IoT device 2 and the connection destination server 1 or when an update request for the connection identification information is sent from the connection destination server 1 to the IoT device 2. Note that the connection identification information is not held in the IoT device 2 before the first connection.

The "identification number" is any character string or the like used in the automatic authentication when the IoT device 2 connects to the connection destination server 1. The identification number used for the first connection (temporary authentication) is generated in advance in the connection destination server 1 together with the connection identification information. The generated identification number is notified to, for example, the operator or program performing the setting for the connection between the IoT device 2 and the connection destination server 1. The operator or program to which the identification number is notified inputs the identification number into a connection application of the IoT device 2, for example.

When the first connection and authentication are successful, in the second connection (main authentication), the connection destination server 1 notifies the identification number required for the second connection to the IoT device 2.

The encryption processing unit 65 of the IoT device 2 that has received the identification number encrypts the identification number using the above-mentioned common key. The connection request unit 62 connects to the connection destination server 1 and performs the automatic authentication by using the encrypted identification number as the second identification number.

The connection destination server 1 and the dedicated download area 52 for downloading a module or the like may be included in the same device as the connection destination server 1 or may be included in different devices. The download destination URI can be set for each download area 52.

However, the authentication (temporary authentication and main authentication) of the IoT device 2 is performed in the connection destination server 1, and the access right to the dedicated download area can be controlled based on authorization information (authentication completion information) given at that time.

The flow of processing for the third and subsequent connection is as follows.

In a case where the IoT device 2 needs to connect to the connection destination server 1, the procedure is as follows. First, the connection request unit 62 sends the identification number issuance request from the IoT device 2 to the connection destination server 1 via the communication unit 39.

The identification number issuing unit 47 of the connection destination server 1 issues the identification number based on the identification number issuance request, and notifies the identification number to the IoT device 2.

The encryption processing unit 65 of the IoT device 2 encrypts the identification number notified from the connection destination server 1 using the common key. The encryption processing unit 65 connects to the connection destination server 1 by using the encrypted identification number as the identification number for connection.

Next, the procedure for distributing the parameter file at the time of the first connection from the IoT device 2 is described below.

Before the initial setting of the IoT device 2 is performed, the IoT device information acquisition/registration unit 41 of the connection destination server 1 registers the information regarding the IoT device 2 (IoT device-related information) in which the initial setting is to be performed.

After the registration of the above-mentioned IoT device-related information is completed in the connection destination server 1, the parameter file and the like generation/provision/deletion unit 43 generates a parameter file to be distributed to the IoT device 2. The parameter file and the like generation/provision/deletion unit 43 arranges the generated parameter file in the download area 52 prepared for each IoT device 2.

At the time of the first connection (after temporary authentication), the IoT device 2 downloads the parameter file arranged in its own dedicated download area 52.

The parameter file and the like acquisition unit 63 of the IoT device 2 fetches the downloaded parameter file, and notifies the completion of fetching the parameter file to the connection destination server 1 when the fetching is completed.

The parameter file and the like generation/provision/deletion unit 43 of the connection destination server 1 that has received the notification deletes the parameter file in the download area 52 corresponding to the IoT device 2 that has notified the completion of fetching the parameter file.

Next, a case of performing the update of the program and parameter information will be described.

In a case where the update of the program for IoT devices is required, the procedure is as follows.

The updated program or updated parameter file in arranged in the download area corresponding to the IoT device, in the connection destination server 1.

The update processing unit 48 of the connection destination server 1 requests the IoT device 2 to update the program via the communication unit 19. At that time, the identification number issuing unit 47 also notifies the identification number for connection to the IoT device 2.

When the IoT device 2 receives the program update request information and the identification number transmitted from the connection destination server 1, the encryption processing unit 65 encrypts the identification number using the common key.

Based on the program update request information, the connection request unit 62 of the IoT device 2 sends a connection request to the connection destination server 1 using the encrypted identification number and the parameter information fetched last time. As a result, after the authentication by the connection destination server 1, the parameter file and the like acquisition unit 63 of the IoT device 2 downloads the update program (update module) and the update parameter file arranged in the download area 52 corresponding to the IoT device 2.

The parameter file and the like acquisition unit 63 of the IoT device 2 updates the program using the downloaded update program (or update module), or performs processing of fetching the parameter using the downloaded update parameter file.

When the update processing is completed, the parameter file and the like acquisition unit 63 of the IoT device 2 notifies the update completion to the connection destination server 1.

Upon receiving the notification of the update completion from the IoT device 2, the parameter file and the like generation/provision/deletion unit 43 of the connection destination server 1 deletes the update program (update module) and the update parameter file arranged in the download area 52 corresponding to the IoT device 2.

Next, tampering check processing in data transmission/reception between the IoT device 2 and the connection destination server 1 is described below.

When data transmission/reception is performed between the IoT device 2 and the connection destination server 1, after the file (data) to be transmitted and received is generated, the tampering prevention processing unit (45 or 64) of the generation source calculates a hash value of the file (data).

The tampering prevention processing unit (45 or 64) of the generation source notifies the calculated hash value (first hash value) to the destination (data acquirer) of the file (data).

In addition, the tampering prevention processing unit (45 or 64) of the generation source assigns the hash value (second hash value) to the file (data).

The tampering prevention processing unit (45 or 64) on the data acquisition side that acquires the file (data) compares the hash value (first hash value) notified from the transmission source with the hash value (second hash value) assigned to the file (data), and checks whether both the hash values are the same.

In a case where the first hash value and the second hash value are not the same, the tampering prevention processing unit (45 or 64) on the data acquisition side cancels the processing because there is a risk that the file (data) has been tampered.

In a case where the first hash value and the second hash value are the same, the tampering prevention processing unit (45 or 64) on the data acquisition side performs processing of acquiring the data (file).

The application to be installed in the IoT device 2 in advance may be downloaded from, for example, a store or a dedicated site providing the application, or may have already been installed as the firmware of the IoT device 2 at the time of shipment.

Next, the communication processing between the IoT device 2 and the connection destination server 1 will be described with reference to FIGS. 5 to 7.

Figure 5:
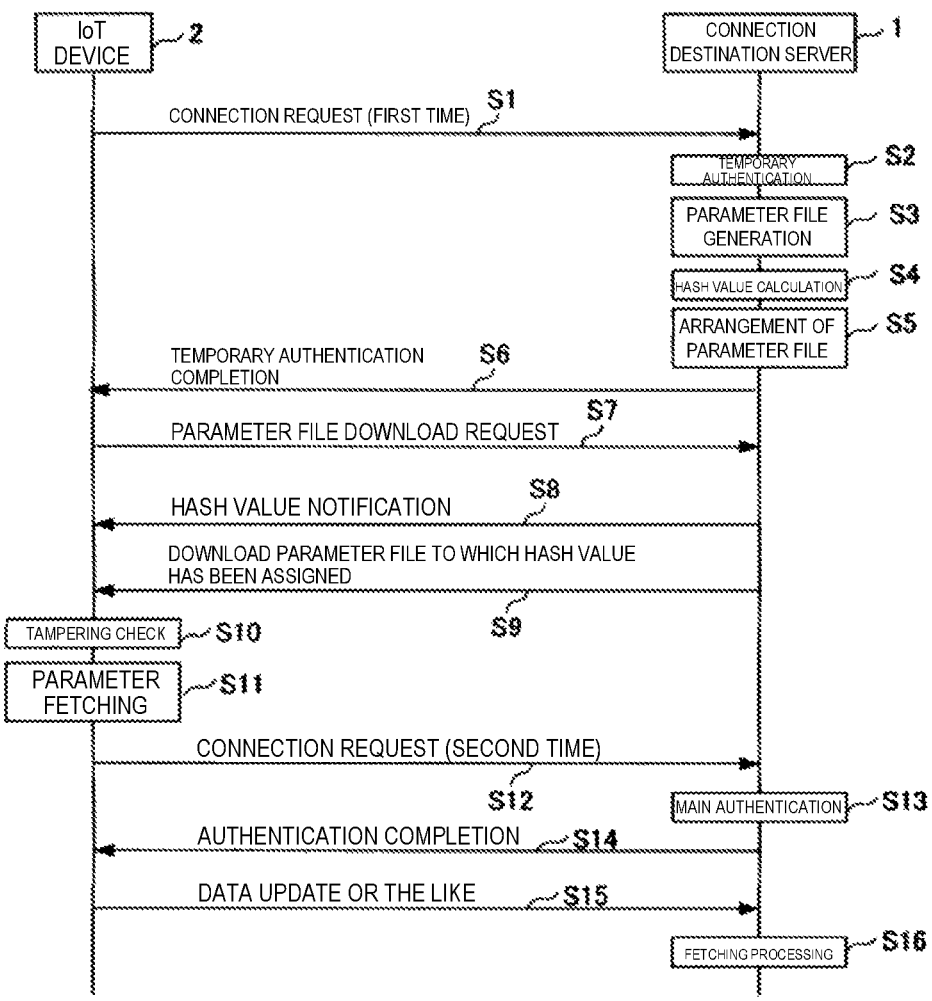
FIG. 5 is a diagram for describing a flow from the first connection to the second connection between the IoT device 2 and the connection destination server 1.

FIG. 5 is a diagram for describing a flow from the first connection to the second connection between the IoT device 2 and the connection destination server 1. Here, it is assumed that the application of the present embodiment is installed in advance in the IoT device 2, and the initial setting (registration or the like of the IoT device identification information, the connection destination URI, and the identification number for the first connection) is performed by the initial setting unit 61. Further, it is assumed that, also in the connection destination server 1, the IoT device information acquisition/registration unit 41 registers the IoT device-related information 51 in the storage unit 18, and also stores information required for generating the parameter file in the storage unit 18.

In step S1, the IoT device 2 (connection request unit 62) sends the first connection request to the connection destination server 1 based on the preset connection destination URI. The first connection request includes the IoT device identification information, the connection destination URI, and the identification number for the first connection.

In step S2, the connection destination server 1 (temporary authentication unit 42) identifies the IoT device 2 that has sent the connection request, and authenticates (temporary authentication) the authenticity of the identified IoT device 2, based on the IoT device identification information and the identification number which are registered in advance, and the connection request from the IoT device 2.

In step S3, the connection destination server 1 (parameter file and the like generation/provision/deletion unit 43) generates a parameter file from the information required for generating the parameter file, which is registered in advance.

In step S4, the connection destination server 1 (tampering prevention processing unit 45) calculates the hash value.

In step S5, the connection destination server 1 (parameter file and the like generation/provision/deletion unit 43) assigns the hash value to the generated parameter file, and arranges the parameter file in the download area 52 corresponding to the IoT device 2 that has sent the connection request.

In step S6, the connection destination server 1 (temporary authentication unit 42) notifies the completion of the temporary authentication to the IoT device 2, and grants permission for the first connection request. The notification of the completion of the temporary authentication includes the URI (download destination URI) that specifies the download area 52 corresponding to the IoT device 2.

In step S7, the IoT device 2 (parameter file and the like acquisition unit 63) sends a download request for the parameter file based on the notified download destination URI.

In step S8, the connection destination server 1 (tampering prevention processing unit 45) notifies the hash value calculated in step S4 to the IoT device 2.

In step S9, the connection destination server 1 (parameter file and the like generation/provision/deletion unit 43) transmits the parameter file (parameter file to which the hash value is assigned) arranged in the download area 52 corresponding to the IoT device 2, based on the download request.

In step S10, the IoT device 2 (tampering prevention processing unit 64) compares the hash value acquired in step S8 with the hash value assigned to the parameter file acquired in step S9. As a result of the comparison, in a case where two hash values are the same, the IoT device 2 (tampering prevention processing unit 64) determines that the parameter file has not been tampered, and the processing proceeds to step S11. As a result of the comparison, in a case where two hash values are different values, the IoT device 2 (tampering prevention processing unit 64) determines that the parameter file has been tampered, and cancels the subsequent processing.

In step S11, the IoT device 2 (parameter file and the like acquisition unit 63) fetches parameter information in the parameter file. The parameter information includes the URI (connection destination URI) for the IoT device 2 to connect to the connection destination server 1, the identification information (notification destination) for specifying the connection destination server 1, a unique identifier (connection identification information) for specifying the connection relationship between the IoT device 2 and the connection destination server 1, the second identification number, the common key and its expiration date, parameter expiration date, and the like.

In step S12, the IoT device 2 (connection request unit 62) sends a second connection request to the connection destination server 1 using the fetched parameter information.

In step S13, the connection destination server 1 (main authentication unit 46) identifies the connection relationship with the IoT device 2 that has sent the connection request, and authenticates (main authentication) the authenticity of the identified connection relationship, based on the connection identification information and the second identification number which are registered in advance, and the connection request from the IoT device 2.

In step S14, the connection destination server 1 (main authentication unit 46) notifies the completion of the main authentication to the IoT device 2, and grants permission for the second connection request. As a result, the communication between the IoT device 2 and the connection destination server 1 is established, and transmission and reception of data and the like can be mutually performed.

In step S15, the IoT device 2 (data transmission/reception control unit 66) transmits data to the connection destination server 1.

In step S16, the connection destination server 1 (data transmission/reception control unit 44) acquires the data transmitted from the IoT device 2, and performs processing of fetching the data.

Figure 6:
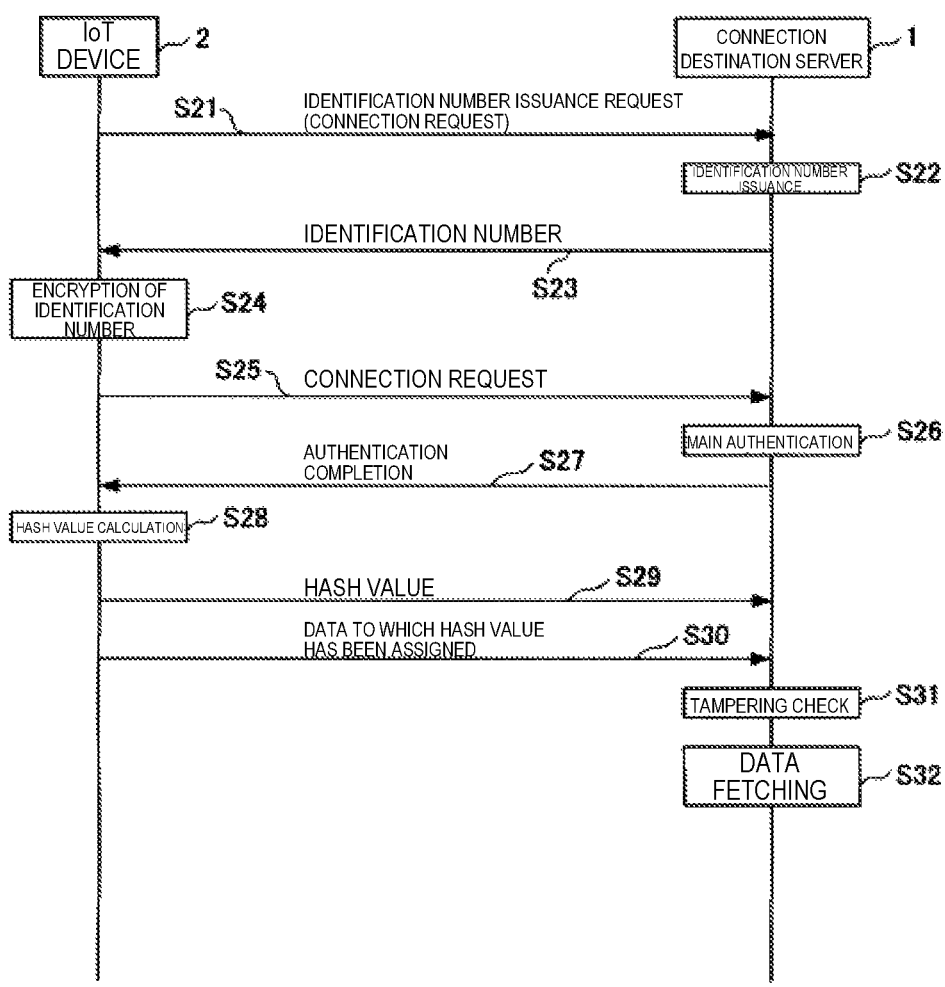
FIG. 6 is a diagram for describing a flow from the first connection to the third and subsequent connection between the IoT device 2 and the connection destination server 1.

FIG. 6 is a diagram for describing a flow of the third and subsequent connection between the IoT device 2 and the connection destination server 1.

In step S21, the IoT device 2 (connection request unit 62) sends the identification number issuance request to the connection destination server 1.

The connection destination server 1 (identification number issuing unit 47) issues the identification number based on the identification number issuance request in step S22, and transmits the identification number to the IoT device 2 in step S23.

In step S24, the IoT device 2 (encryption processing unit 65) encrypts the identification number transmitted from the connection destination server 1 using the common key.

In step S25, the IoT device 2 (connection request unit 62) sends the connection request to the connection destination server 1 using the parameter information fetched in step S11 and the identification number encrypted in step S24.

In step S26, the connection destination server 1 (main authentication unit 46) identifies the connection relationship with the IoT device 2 that has sent the connection request, and authenticates (main authentication) the authenticity of the identified connection relationship, based on the connection identification information and the encryption information which are registered in advance, and the connection request (including the encrypted identification number) from the IoT device 2. In the authentication of the authenticity of the identified connection relationship, the connection destination server 1 (main authentication unit 46) acquires the encrypted identification number from the IoT device 2 (connection request unit 62), and decrypts the identification number using the common key. In a case where the decrypted identification number and the identification number held in advance are the same, the connection destination server 1 authenticates the authenticity of the identified connection relationship.

In step S27, the connection destination server 1 (main authentication unit 46) notifies the completion of the main authentication to the IoT device 2, and grants permission for the third and subsequent connection requests. As a result, the communication between the IoT device 2 and the connection destination server 1 is established, and transmission and reception of data and the like can be mutually performed.

The IoT device 2 (tampering prevention processing unit 64) calculates the hash value in step S28, and notifies the calculated hash value to the connection destination server 1 in step S29.

The IoT device 2 (tampering prevention processing unit 64 and data transmission/reception control unit 66) assigns the calculated hash value to the data to be transmitted in step S29, and transmits the data to which the hash value is assigned to the connection destination server 1 in step S30.

In step S31, the connection destination server 1 (tampering prevention processing unit 45) compares the hash value acquired in step S29 with the hash value assigned to the data acquired in step S30. As a result of the comparison, in a case where two hash values are the same, the connection destination server 1 (tampering prevention processing unit 45) determines that the acquired data has not been tampered, and the processing proceeds to step S32. As a result of the comparison, in a case where two hash values are different values, the connection destination server 1 (tampering prevention processing unit 45) determines that the acquired data has been tampered, and cancels the subsequent processing.

In step S32, the connection destination server 1 (data transmission/reception control unit 44) performs processing of fetching the acquired data.

Figure 7:
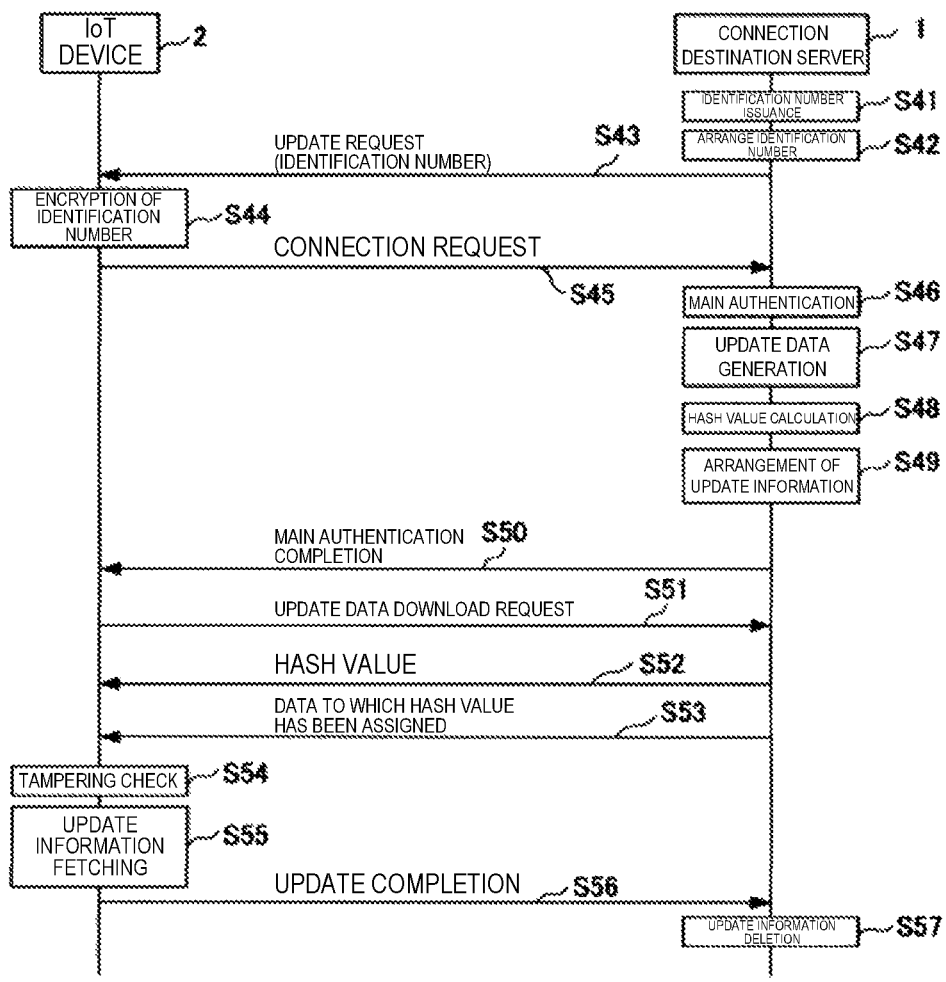
FIG. 7 is a diagram for describing a flow of processing performed in a case where an application or a parameter file is updated.

FIG. 7 is a diagram for describing a flow of processing performed in a case where an application or a parameter file is updated.

The connection destination server 1 (identification number issuing unit 47) issues the identification number in step S41, and arranges the issued identification number in the download area 52 corresponding to the IoT device 2 as the notification target in step S42.

In step S43, the connection destination server 1 (update processing unit 48) sends an update request (including the identification number issued in step S41) to the IoT device 2 such that the application, the parameter file, and the like are updated.

In step S44, the IoT device 2 (encryption processing unit 65) encrypts the identification number included in the acquired update request using the common key.

In step S45, the IoT device 2 (connection request unit 62) sends the connection request to the connection destination server 1 using the parameter information fetched in step S11 and the identification number encrypted in step S44.

In step S46, the connection destination server 1 (main authentication unit 46) identifies the connection relationship with the IoT device 2 that has sent the connection request, and authenticates (main authentication) the authenticity of the identified connection relationship, based on the connection identification information and the encryption information which are registered in advance, and the connection request (including the encrypted identification number) from the IoT device 2. In the authentication of the authenticity of the identified connection relationship, the connection destination server 1 (main authentication unit 46) acquires the encrypted identification number from the connection request, and decrypts the identification number using the common key. In a case where the decrypted identification number and the identification number held in advance are the same, the connection destination server 1 authenticates the authenticity of the identified connection relationship.

In step S47, the connection destination server 1 (update processing unit 48) generates update information (updated application, updated parameter file, and the like).

In step S48, the connection destination server 1 (tampering prevention processing unit 45) calculates the hash value.

In step S49, the connection destination server 1 (tampering prevention processing unit 45 and data transmission/reception control unit 44) assigns the hash value to the generated update information, and arranges the update information in the download area 52 corresponding to the IoT device 2.

In step S50, the connection destination server 1 (main authentication unit 46) notifies the information indicating the completion of the main authentication to the IoT device 2. The notification of the completion of the main authentication includes the URI (download destination URI) that specifies the download area 52 corresponding to the IoT device 2.

In step S51, the IoT device 2 (parameter file and the like acquisition unit 63) sends the download request for the update information based on the notified download destination URI.

In step S52, the connection destination server 1 notifies the hash value calculated in step S48 to the IoT device 2.

In step S53, the connection destination server 1 transmits the update information (update information to which the hash value is assigned) arranged in the download area 52 corresponding to the IoT device 2, based on the download request.

In step S54, the IoT device 2 (tampering prevention processing unit 64) compares the hash value acquired in step S52 with the hash value assigned to the update information acquired in step S53. As a result of the comparison, in a case where two hash values are the same, the IoT device 2 (tampering prevention processing unit 64) determines that the update information has not been tampered, and the processing proceeds to step S55. As a result of the comparison, in a case where two hash values are different values, the IoT device 2 (tampering prevention processing unit 64) determines that the update information has been tampered, and cancels the subsequent processing.

In step S55, the IoT device 2 (data transmission/reception control unit 66) fetches the update information (updated application, updated parameter file, and the like).

In step S56, the IoT device 2 (data transmission/reception control unit 66) notifies the completion of the update to the connection destination server 1.

In step S57, the connection destination server 1 (parameter file and the like generation/provision/deletion unit 43) deletes the update information (update information to which the hash value is assigned) arranged in the download area 52 corresponding to the IoT device 2.

According to the present embodiment, as described above, the authenticity of the IoT device, the connection destination server device, and the like can be guaranteed without using third-party authentication. That is, as with the relationship between the electricity meter installed in a home or the like and the electric power company, the IoT device 2 and the connection destination server 1 that connects to the IoT device 2 via a network are in a relationship of identifying and recognizing each other. A unique identifier (connection identification information) is assigned to the relationship of those two devices, and the identifier is held between the IoT device 2 and the connection destination server 1 and is referred to so that the mutual authenticity can be guaranteed.

The connection identification information may be a combination of the unique identification information (a) indicating the IoT device 2 and the unique identification information (b) indicating the connection destination server 1. The configuration of the connection identification information may be, for example, the identification information (a)+the identification information (b) or the identification information (b)+the identification information (a), but the connection identification information may be configured according to a predetermined rule so that the connection identification information can be separated into the identification information (a) and the identification information (b).

In addition to the connection identification information, the identification information (for example, an ID that can specify a predetermined device (for example, vehicle identification number, device serial number), the network address, and the like) that can specify the IoT device 2 via the network or the identification number may be included.

It is necessary for the IoT device 2 and the connection destination server 1 to mutually hold the connection identification information, but the following method can be used as a method for introducing the connection identification information into each device.

An operator may set predetermined connection identification information in the IoT device 2 by using the application to be installed in the IoT device 2 and the connection destination server 1. Further, the connection identification information may be set in the IoT device 2 by a program or the like.

Alternatively, the connection identification information may be held in advance in the application to be installed in the IoT device and the connection destination server device and the like.

The connection identification information generated by the IoT device 2 may be transmitted to the connection destination server 1 by methods such as inter-application notification, inter-application communication, and file exchange, and the connection identification information may be fetched, set, and held in the connection destination server 1.

In addition, the connection identification information generated by the IoT device may be transmitted to a third-party device (for example, a smartphone) by inter-application notification, inter-application communication, file exchange, or the like, and may be displayed on the third-party device. Alternatively, the connection identification information may be printed and manually input to the connection destination server 1, or the connection identification information may be set in the connection destination server 1 by a program or the like linked with the third-party device.

In addition, the connection identification information generated by the connection destination server 1 may be transmitted to a third-party device (for example, a smartphone) by inter-application notification, inter-application communication, file exchange, or the like, and may be displayed on the third-party device. Alternatively, the connection identification information may be printed and manually input to the IoT device 2, or the connection identification information may be set in the IoT device 2 by a program or the like linked with the third-party device.

Further, in the above embodiment, the description has been made by focusing on the communication between the IoT device 2 and the connection destination server 1, but instead of the connection destination server 1, the IoT device 2 having the communication authentication function performed by the connection destination server 1 in FIGS. 5 to 7 may be used. That is, by using the mutual authenticity guarantee of IoT devices using connection identification information, in two IoT devices or a plurality of IoT devices by a combination of relationships in which the authenticity is guaranteed using the relationship of the two IoT devices, it is also possible to safely transmit and receive information, mutually acquire information regarding the other device, and operate the other device.

For example, the contents transmitted and received between the IoT device 2 and the connection destination server 1 or between the IoT device 2 and another IoT device 2 differ depending on the characteristics of the IoT device, and examples are described below.

(1) Transmission and reception of status of IoT device: power ON/OFF, power saving mode, and the like (2) Transmission and reception of setting values of IoT devices (3) Transmission and reception of information acquired by sensors or the like, or its records (logs)

(4) Transmission and reception of information of IoT devices operated by people or other devices or its records (logs)

(5) Requests to report status of IoT devices and report of results (6) Requests to change status of IoT devices and their results (remote operation requests of IoT devices and report or the like of result information or progress information of remote operation)

(7) Requests to change setting values of IoT devices and report of result of changing setting value (8) Request to update application installed in IoT device and report of result thereof (9) Request to update or abolish connection identification information or the like, and report of result thereof

(10) Request to update or abolish information on mutual connection destinations and notification destinations, and report result thereof Note that encryption may be used to conceal the contents transmitted and received between the IoT device 2 and the connection destination server 1 or between the IoT device 2 and another IoT device 2. In addition, in order to check the tampering of the contents transmitted and received between the IoT device 2 and the connection destination server 1 or between the IoT device 2 and another IoT device 2, verification of the contents may be performed using the hash value or the like of the transmitted and received contents.

Also, the transmission and reception between IoT device 2 and the connection destination server, or between IoT device 2 and another IoT device 2 may be performed using any method such as inter-application communication, inter-application notification, and file exchange, as long as the information can be exchanged via the network. The transmission and reception between the IoT devices may be performed via a predetermined storage location of data and files on the network, or the transmission and reception of information may be performed directly.

In a case where the processing of each functional block is executed by software, the computers constituting the software are installed on the computer or the like from a network or a recording medium.

The computer may be a computer embedded in specialized hardware. Further, the computer may be a computer capable of executing various functions by installing various programs, for example, a general-purpose smartphone or a personal computer in addition to a server.

The recording medium including such a program is not only composed of a removable medium distributed separately from the device main body in order to provide the program to each user, but also is composed of a recording medium or the like provided to each user in a state of being preliminarily incorporated in the device main body.

In the present specification, steps describing a program recorded on the recording medium include not only processing chronologically performed in order of the steps, but also processing executed in parallel or individually, without being necessarily and chronologically processed.

Summarizing the above, the information processing system to which the present invention is applied suffices to have the following configuration, and may adopt various embodiments.

That is, the information processing system to which the present invention is applied suffices to be an information processing system including a server device (for example, connection destination server 1) and a terminal device (for example, IoT device 2) of the same type or a different type capable of performing communication via a communication network, the server device includes a provision unit (for example, parameter file and the like generation/provision/deletion unit 43) that provides, to the terminal device, a parameter file including a predetermined identifier for uniquely identifying a relationship between the terminal device and the server device, and connection destination information regarding a connection destination of the server device, the terminal device includes a request unit (for example, connection request unit 62) that accesses the server device specified by the connection destination information in the parameter file, and requests issuance of a timed identification number, and a transmission unit (for example, connection request unit 62) that transmits the identifier and the timed identification number to the server device when connecting to the server device specified by the connection destination information in the parameter file, and the server device includes an authentication unit (for example, main authentication unit 46) that authenticates the terminal device using the identifier, and confirms an authenticity of the terminal device using the timed identification number.

By applying such an information processing system, it is possible to provide an authentication technique having higher security between IoT devices and server devices or between IoT devices. That is, the IoT device 2 and the connection destination server 1 or the IoT device 2 and another IoT device 2 are in a relationship of identifying and recognizing each other, unique connection identification information is assigned to the relationship of those two devices, and the connection identification information is held between the connecting devices and is referred to so that the mutual authenticity can be guaranteed.

The provision unit may be configured to hold the parameter file in a download area (for example, download area w52) dedicated for the terminal device, and provides the parameter file to the terminal device.

Accordingly, it is possible to securely perform transmission and reception of data such as a parameter file between the IoT devices and between the server devices or between the IoT devices.

The terminal device may be configured to include a data collation unit (for example, tampering prevention processing unit 45 or 64) that is configured to, in a case where first data is transmitted to the server device, notify a hash value of the first data as a first hash value to the server device, and transmit the first data to which the first hash value is assigned to the server device, and in a case where second data and second hash value transmitted from the server device are received, collate a hash value assigned to the second data with the second hash value, and acquire the second data according to a collation result.

As a result, it is possible to prevent tampering of data to be transmitted and received.

The present invention is not limited to the embodiments described above, and various configurations or embodiments can be adopted without departing from the gist of the present invention.

REFERENCE SIGNS LIST

1 server
2 IoT device
41 IoT device information acquisition/registration unit
42 temporary authentication unit
43 parameter file and the like generation/provision/deletion unit
44 data transmission/reception control unit
45 tampering prevention processing unit
46 main authentication unit
47 identification number issuing unit
48 update processing unit
51 IoT device-related information
52 download area
61 initial setting unit
62 connection request unit
63 parameter file and the like acquisition unit
64 tampering prevention processing unit
65 encryption processing unit
66 data transmission/reception control unit

The invention claimed is:

1. An information processing system including:
a server device, configured to perform operations comprising:
registering, by a an IoT device information acquisition/registration unit in advance of a first connection with a terminal device, IoT device identification information for identifying the terminal device and an identification number for first connection;
identifying, by a temporary authentication unit, the terminal device upon the first connection using the IoT device identification information, and performing temporary authentication of the terminal device using the identification number for first connection;
providing, by a provision unit, to the terminal device, after the terminal device has been temporarily authenticated by the temporary authentication unit, a parameter file including a predetermined identifier, for use in authenticating future connections directly between the terminal device and the server device, the predetermined identifier for uniquely identifying a connection between the terminal device and the server device, of which mutual authenticity has been guaranteed by the temporary authentication unit;

issuing, by an identification number issuing unit, a timed identification number in response to a request of the issuance of the timed identification number from the terminal device, and identifying, by an authentication unit, a direct connection relationship with the terminal device using the predetermined identifier and the timed identification number, to authenticate an authenticity of the identified connection relationship;

a terminal device of the same type or a different type capable of communicating via a communication network, and configured to perform operations comprising:

registering, by an initial setting unit, the IoT device identification information for identifying the terminal device, the connection destination information of the server device, and the identification number for a first connection to the server device, in advance of the server device and the terminal device being in a connection relationship of recognizing each other;

requesting, by a connection request unit, a connection by directly connecting to the server device using the connection destination information and transmitting the IoT device identification information and the identification number for first connection;

accessing, by a request unit, the server device specified by the connection destination information in the parameter file, and requesting issuance of a timed identification number; and transmitting, by a transmission unit, the predetermined identifier and the timed identification number to the server device when connecting to the server device specified by the connection destination information in the parameter file.

2. The information processing system according to claim 1,
wherein the provision unit holds the parameter file in a download area dedicated for the terminal device, and provides the parameter file to the terminal device.

3. The information processing system according to claim 1,
wherein the terminal device further includes a data collation unit that is configured to
in a case where first data is transmitted to the server device, notify a hash value of the first data as a first hash value to the server device, and transmit the first data to which the first hash value is assigned to the server device, and
in a case where second data and second hash value transmitted from the server device are received, collate a hash value assigned to the second data with the second hash value, and acquire the second data according to a collation result.

4. The information processing system of claim 1, further wherein the terminal device is further configured to perform operations comprising:
determining, by a tamper prevention processing unit, whether the parameter file has been tampered with by comparing the information in the parameter file to the timed identification number; and wherein transmitting, by the transmission unit, the predetermined identifier and the timed identification number to the server device when connecting to the server device specified by the connection destination information in the parameter file is performed if the tamper prevention processing unit determines that eh parameter file has not been tampered with.

5. A non-transitory computer-readable medium having stored thereon program instructions for an information processing system including a server device and a terminal device of the same type or a different type capable of performing communication via a communication network, the program instructions causing a processor of the terminal device to execute operations comprising:
an initial setting step of registering, in the terminal device, IoT device identification information for identifying the terminal device, connection destination information of the server device, and an identification number for first connection to the server device in advance of the first connection;
a connection request step of requesting connection by directly connecting to the server device using the connection destination information and transmitting the IoT device identification information and the identification number for first connection;
a parameter file acquisition step of acquiring a parameter file when the server device performs temporary authentication in the server device in response to the connection request, and provides the parameter file including a predetermined identifier for uniquely identifying a connection relationship between the terminal device and the server device of which mutual authenticity is guaranteed by the temporary authentication, and the connection destination information regarding a connection destination of the server device;
a request step of accessing the server device specified by the connection destination information regarding the connection destination of the server device, in the parameter file, and requesting issuance of a timed identification number; and
a transmission step of, when connecting to the server device specified by the connection destination information, transmitting the timed identification number and the predetermined identifier for uniquely identifying a connection between the terminal device and the server device of which mutual authenticity is guaranteed to the server device such that a connection relationship with the terminal device is identified in the server device by using the predetermined identifier and the timed identification number and an authenticity of the identified connection relationship is guaranteed.

6. A non-transitory computer-readable medium having stored thereon program instructions for an information processing system including a server device and a terminal device of the same type or a different type capable of performing communication via a communication network, the program instructions causing a processor of the server device to execute operations comprising:
an IoT device information acquisition/registration step of registering IoT device identification information for identifying the terminal device and an identification number for a first connection with the terminal device in advance of the first connection;
a temporary authentication step of identifying the terminal device upon the first connection using the IoT device identification information and performing temporary authentication of the terminal device using the identification number for first connection at a time of a first connection request from the terminal device;

a provision step of providing, to the terminal device, after the terminal device has been temporarily authenticated by the temporary authentication unit, a parameter file including a predetermined identifier, for use in authenticating future connections directly between the terminal device and the server device, the predetermined identifier for uniquely identifying a connection relationship between the terminal device and the server device of which mutual authenticity has been guaranteed by the temporary authentication unit, and connection destination information regarding a connection destination of the server device such that a connection relationship with the terminal device is identified in the server device by using the predetermined identifier and the timed identification number and an authenticity of the identified connection relationship is guaranteed;

an identification number issuing step of issuing the timed identification number in response to a request of issuance of the timed identification number from the terminal device; and an authentication step of identifying a direct connection relationship with the terminal device using the timed identification number and the predetermined identifier for uniquely identifying a relationship between the terminal device and the server device of which mutual authenticity is guaranteed, and authenticating an authenticity of the identified connection relationship, in response to connection from the terminal device.

* * * * *